United States Patent
Göpner

(10) Patent No.: US 10,438,480 B2
(45) Date of Patent: Oct. 8, 2019

(54) SYSTEM FOR AUTOMATICALLY LINKING A RADIO REMOTE CONTROL WITH AN INDUSTRIAL TRUCK AND AN ASSOCIATED METHOD

(71) Applicant: Jungheinrich Aktiengesellschaft, Hamburg (DE)

(72) Inventor: Oliver Göpner, Oering (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/806,396

(22) Filed: Nov. 8, 2017

(65) Prior Publication Data

US 2018/0130342 A1 May 10, 2018

(30) Foreign Application Priority Data

Nov. 10, 2016 (DE) .......... 10 2016 121 505

(51) Int. Cl.
  *G08C 17/02* (2006.01)
  *B66F 9/075* (2006.01)
  (Continued)

(52) U.S. Cl.
  CPC .......... *G08C 17/02* (2013.01); *B66F 9/07581* (2013.01); *G05D 1/0276* (2013.01);
  (Continued)

(58) Field of Classification Search
  None
  See application file for complete search history.

(56) References Cited

U.S. PATENT DOCUMENTS 4,849,735 A 7/1989 Kirtley et al.
2007/0074923 A1* 4/2007 Billger .................. B60N 2/002
  180/330
(Continued)

FOREIGN PATENT DOCUMENTS

CN  105101467 A  11/2015
DE  19957536 A1  6/2001
(Continued)

OTHER PUBLICATIONS

EP 3321227; May 16, 2018; European Search Report dated Mar. 16, 2018; 7 pages.

*Primary Examiner* — Leon Viet Q Nguyen
(74) *Attorney, Agent, or Firm* — Barclay Damon LLP

(57) ABSTRACT

A system for automatically linking a radio remote control to an industrial truck comprises at least three transmitting and receiving units disposed in a predetermined spatial arrangement relative to each other in the industrial truck. The at least three transmitting and receiving units are configured to transmit search signals and receive response signals. A radio remote control is configured to receive and process the search signals transmitted by the transmitting and receiving units and to transmit corresponding response signals. The system further comprises an evaluation unit that is configured to determine signal propagation times of the transmitted search signals and the received corresponding response signals and to determine a position of the radio remote control. A control unit configured to link the radio remote control with the industrial truck when the relative position of the radio remote control lies within a predetermined area.

17 Claims, 2 Drawing Sheets

(51) Int. Cl.
  *G05D 1/02* (2006.01)
  *H04Q 9/02* (2006.01)
  *H04L 29/08* (2006.01)
  *H04W 4/02* (2018.01)

(52) U.S. Cl.
  CPC ........... *H04Q 9/02* (2013.01); *G08C 2201/30* (2013.01); *H04L 67/12* (2013.01); *H04Q 2209/40* (2013.01); *H04W 4/023* (2013.01)

(56) References Cited

U.S. PATENT DOCUMENTS

| | | |
|---|---|---|
| 2010/0114405 A1 | 5/2010 | Elston et al. |
| 2014/0343758 A1 | 11/2014 | Kraimer et al. |
| 2015/0170427 A1* | 6/2015 | Hansen .................. G07C 5/008 701/31.5 |
| 2015/0291127 A1* | 10/2015 | Ghabra .............. G07C 9/00309 701/2 |
| 2015/0296329 A1 | 10/2015 | Mao et al. |

FOREIGN PATENT DOCUMENTS

| | | |
|---|---|---|
| DE | 102013213029 A1 | 1/2015 |
| EP | 1829813 A2 | 9/2007 |

* cited by examiner

SYSTEM FOR AUTOMATICALLY LINKING A RADIO REMOTE CONTROL WITH AN INDUSTRIAL TRUCK AND AN ASSOCIATED METHOD

CROSS REFERENCE TO RELATED INVENTION

This application is based upon and claims priority to, under relevant sections of 35 U.S.C. § 119, German Patent Application No. 10 2016 121 505.8, filed Nov. 10, 2016, the entire contents of which are hereby incorporated by reference.

BACKGROUND

The invention relates to a system comprising a radio remote control that can be automatically linked to an industrial truck, as well as a method for automatically linking an industrial truck to a radio remote control.

Modern industrial trucks can be remotely controlled by a radio remote control. For example, the driving functions of the industrial truck can be remotely controlled, but other functions such as the lifting and lowering functions of a lifting mast together with its load part can be designed to be remotely controllable. Order pickers can also be remotely controlled by a radio remote control by following an operator.

Before such industrial trucks can be remotely controlled, the corresponding radio remote control must be linked to the industrial truck. For this, a permanently fixed link between the industrial truck and radio remote control can be established during initial setup. However, such a fixed connection has the disadvantage that the respective radio remote control can only be used for just one industrial truck. It is also known to link a radio remote control with the industrial truck by entering in the industrial truck a code identifying the radio remote control, or to establish a linkage by means of short-distance radio such as an NFC chip mounted on the industrial truck. Both versions are, however, relatively involved, and operating errors can occur.

A method is known from CN 105101467 A for automatically linking equipment that is based on evaluating the signal intensity. In this context, a wireless controller transmits a linking request to a device to be linked, wherein the device to be linked only responds when the signal intensity of the linkage request exceeds a certain threshold. This method is however very imprecise and undesired linkages can occur. In addition, this method is not entirely automated.

A method is known from US 2015/0296329 A1 for linking wireless communication systems, wherein a device to be linked searches for Bluetooth signals from other linkable devices and initiates a link upon a command from an operator, such as a pushed button. This method is also involved and error-prone. Moreover, this method is not entirely automated.

The object of the invention is to provide a system consisting of an industrial truck and a radio remote control, as well as a method for linking an industrial truck with a radio remote control, wherein the linking is performed easily and reliably in a fully automated manner.

BRIEF SUMMARY OF THE INVENTION

In an embodiment, a system for automatically linking a radio remote control with an industrial truck comprises at least three transmitting and receiving units disposed in a predetermined spatial arrangement relative to each other in the industrial truck and configured to transmit search signals and receive response signals. A the radio remote control is configured to receive and process the search signals transmitted by the transmitting and receiving units and to transmit corresponding response signals. The system further comprises an evaluation unit assigned to the industrial truck and configured to determine the signal propagation times of the transmitted search signals and the corresponding received response signals and to determine a position of the radio remote control with reference to the industrial truck from at least three of the determined signal propagation times. A control unit is configured to link the radio remote control with the industrial truck when the relative position of the radio remote control lies within a predetermined area.

In an embodiment, a method for automatically linking an industrial truck with a radio remote control comprises transmitting search signals by at least three transmitting and receiving units of the industrial truck. Receiving and processing the search signals via the radio remote control and using the radio remote control to transmit response signals corresponding to the search signals. An evaluation unit determines signal propagation times of the transmitted search signals and the corresponding received response signals. Determining a relative position of the radio remote control with reference to the industrial truck from at least three of the determined signal propagation times. and linking the radio remote control to the industrial truck when the relative position of the radio remote control lies within a predetermined area.

According to an embodiment, the industrial truck comprises at least three transmitting and receiving units arranged on a drive part thereof. The at least three transmitting and receiving units are located at predetermined positions in a fixed vehicle coordinate system so that the coordinates of each of the transmitting and receiving units are known within the fixed vehicle coordinate system. For example, the fixed vehicle coordinate system and the positions of the at least three transmitting and receiving units can be saved within this coordinate system in the control unit. The fixed vehicle coordinate system can be two-dimensional or three-dimensional. The transmitting and receiving units can be located within a common plane or arranged in three dimensions. The transmitting and receiving units are configured to transmit and receive signals. For example, the transmitting and receiving units may transmit search signals to search for radio remote controls in the area surrounding of the industrial truck. For example, the search signals can be a link request. The search signals can also each bear an ID that clearly identifies the respective transmitting and receiving unit. The control unit can be configured to control the at least three transmitting and receiving units to transmit the search signals.

Radio remote controls, which are configured to be linked to such an industrial truck, can receive the search signals transmitted by the transmitting and receiving units. The radio remote control is moreover configured to process the received search signals and transmit response signals that correspond to the search signals received by the radio remote control. "Processing" in this context can be understood to mean in particular the generation of such corresponding response signals. A response signal transmitted by the radio remote control can, for example, be a linkage confirmation. The response signal can also contain the ID identifying the respective radio remote control such as an identification number. Moreover, the response signal can contain an ID that clearly identifies the transmitting and receiving unit that the corresponding search signal has sent. The radio remote control is therefore configured to generate a specific response signal for each of the received search signals. The radio remote control can be configured as a portable handheld device or as a glove and be worn or put on by an operator.

The response signals transmitted by the radio remote control in response to the search signals are in turn received by the at least three transmitting and receiving units of the industrial truck. Each of the transmitting and receiving units is configured to receive the response signal intended for it (i.e., the response signal corresponding to its search signal). An evaluation unit of the industrial truck then determines the signal propagation times of the search signals running from the respective transmitting and receiving unit to the radio remote control, and the response signals running from the radio remote control to the respective transmitting and receiving unit. The evaluation unit can also consider an internal processing time by the radio remote control for processing the search signals. Since the respective response signal corresponds to the respective search signal (i.e., bears an ID of the respective transmitting and receiving unit), each response signal can be clearly assigned to the correct transmitting and receiving unit. The evaluation unit then determines the corresponding propagation time for each of the at least three transmitting and receiving units. Consequently, at least three signal propagation times are determined. From the at least three determined signal propagation times, the evaluation unit then determines the distance of each of the at least three transmitting and receiving units to the radio remote control by using computational methods such as trilateration. This gives the position of the radio remote control with reference to the industrial truck. In particular, the position of the radio remote control in the fixed vehicle coordinate system is thereby determined. The position can be determined in two or three coordinates (i.e., in a plane or in three-dimensional space). The X, Y and Z coordinates of the radio remote control can therefore be determined with reference to the fixed vehicle coordinate system. To reliably determine the position in three-dimensional space at least one additional transmitting and receiving unit can be provided.

In an embodiment, the radio remote control is linked to the industrial truck according to the invention only when the relative position of the radio remote control to the industrial truck lies within a predetermined area. This predetermined area can in principle be any area. The predetermined area can be in the proximity of or within the industrial truck, for example in the region of a standing platform of the industrial truck. The predetermined area can be defined by coordinates in the fixed vehicle coordinate system. In an embodiment, the coordinates can be saved in the control unit. The control unit links the radio remote control to the industrial truck only when its position lies within the predetermined area. If the respective search signal comprises a linkage request and the respective corresponding response signal comprises a linkage confirmation, the linkage occur immediately once the radio remote control enters the predetermined area. In addition, the control unit can also transmit a separate coupling signal to the radio remote control once it enters the predetermined area. The industrial truck can have a fixed vehicle radio module that is linked to the radio remote control. The radio module can for example transmit the aforementioned linkage signal. The radio module can also be configured to receive operating commands sent by a linked radio remote control. The evaluation unit can be integrated in the control unit. Moreover, it can be stipulated that a linkage will only occur when a radio remote control is not already linked to the industrial truck. For example, it can be stipulated that the transmitting and receiving units only transmit search signals when there is not an existing linkage with a radio remote control. This can prevent more than one radio remote control from simultaneously linking to an industrial truck.

The system and associated method according to the invention accordingly make it possible to automatically link a radio remote control to an industrial truck entirely without the involvement of an operator. An operator wearing the radio remote control only has to enter the predetermined area in order to initiate a link between the radio remote control and industrial truck. This type of link can be realized particularly easily and human error cannot occur since the linkage is entirely automated. The industrial truck can be in contact with several radio remote controls by exchanging the described signals, wherein only one radio remote control is linked that is within or enters the predetermined area. Using the at least three transmitting and receiving units, the actual position of the radio remote control can be determined very precisely so that accidental links with radio remote controls in the proximity of the predetermined area do not occur. A link is to be understood as a 1:1 connection (i.e., an exclusive connection) between the radio remote control and industrial truck. This can be established by the exchange of hardware addresses.

According to an embodiment, the industrial truck has a standing platform and the control unit is configured to recognize a person located on the standing platform. The control unit then links the radio remote control to the industrial truck only when it recognizes that there is an operator on the standing platform. Accordingly, monitoring the standing platform of the industrial truck for the presence of an operator can be another coupling condition. Even when the radio remote control is located within the predetermined area, a linkage does not occur in this case as long as an operator on the standing platform is not also recognized. A dead man's switch or pedal can serve to recognize an operator on the standing platform. Preferably, the predetermined area comprises the standing platform so that the operator with the radio remote control must be on the standing platform in order to initiate a link. This can accordingly ensure that the radio remote control also actually links with the desired industrial truck. The standing platform can in principle also be an operator seat or the like. It can be stipulated that the at least three transmitting and receiving units only transmit the search signals when an operator is standing on the standing platform.

According to another embodiment, the industrial truck may have a display unit. The display unit can display a message when the industrial truck recognizes more than one radio remote control within the predetermined area. No linkage initially occurs between the industrial truck and a radio remote control when the relative position of several radio remote controls lies within the predetermined area. Alternatively or in addition to the display unit of the industrial truck, the radio remote control can also comprise a display unit. The display unit assigned to the radio remote control can also be configured to output a message when the relative position of several radio remote controls lies within the predetermined area. Information can also be output by the display unit of the industrial truck and/or the radio remote control as to whether an operator is on a standing platform that may be provided. It can also be stipulated that the display unit of the industrial truck and/or the radio remote control depict a successful linkage of the radio remote control with the industrial truck on the display unit.

The display units can output the aforementioned messages visually, acoustically and/or haptically, for example.

BRIEF DESCRIPTION OF THE DRAWINGS

The invention will be explained below with reference to figures. If not otherwise specified, the same reference numbers indicate the same subjects. In the following.

DETAILED DESCRIPTION OF THE INVENTION

Figure 1:
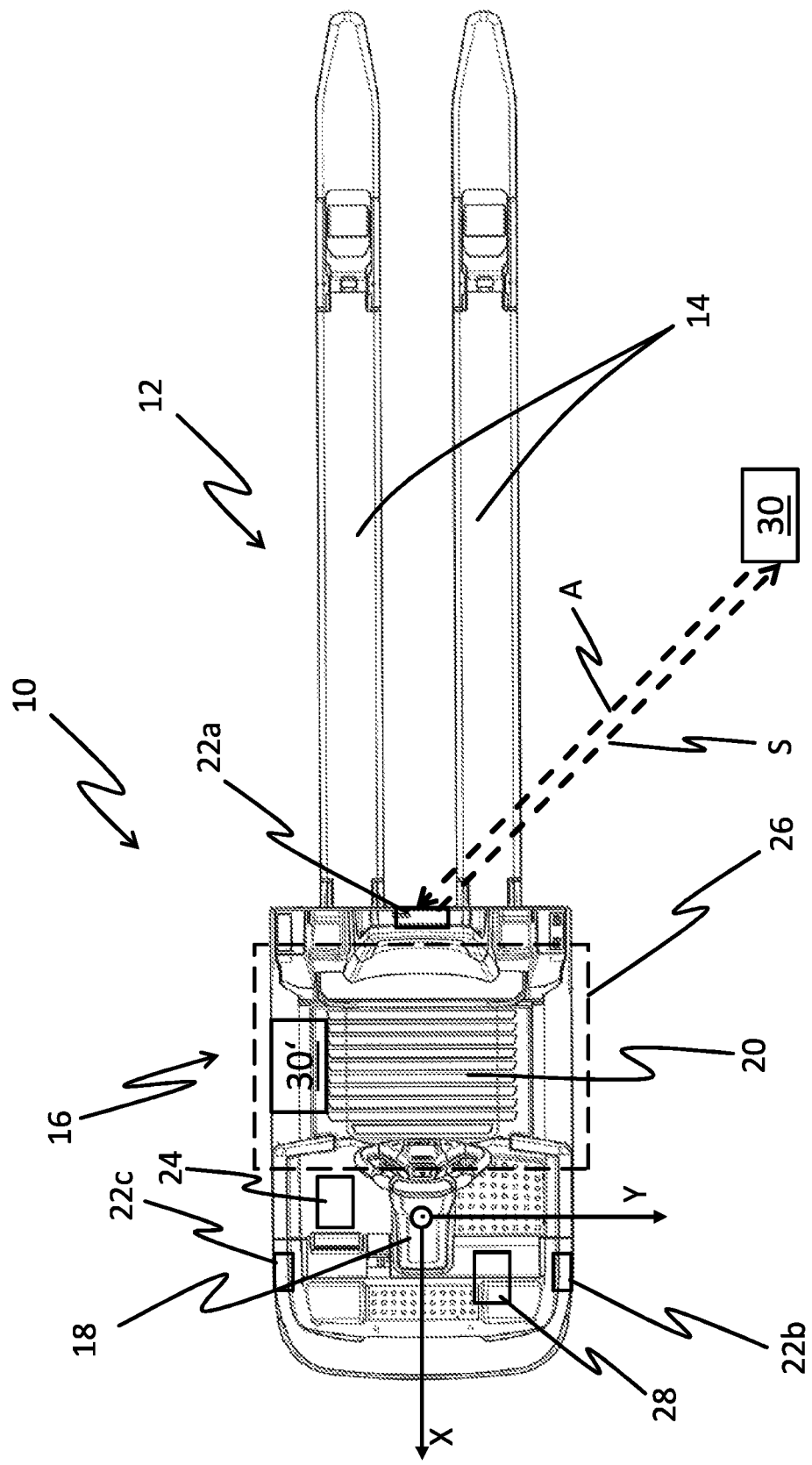
FIG. 1 illustrates a top plan view of an embodiment of an order picker with a radio remote control.

FIG. 1 shows an industrial truck 10 in a plan view. The industrial truck 10 comprises a load part 12 with two forks 14 that are configured to receive palettes for picking goods. Moreover, the industrial truck 10 comprises a drive part 16 with a short drawbar 18 and a standing platform 20. An operator standing on the standing platform 20 can guide the industrial truck 10 by the short drawbar 18.

The drive part 16 has three transmitting and receiving units 22a, 22b, 22c whose positions are defined in a fixed vehicle coordinate system. The fixed vehicle coordinate system and the positions of the three transmitting and receiving units 22a, 22b, 22c can be saved in a control unit 24 of the industrial truck 10. The fixed vehicle coordinate system has three axes X, Y and Z that are at a right angle relative to each other and the Z axis in FIG. 1 extends into the plane. In an embodiment, the fixed vehicle coordinate system, a predetermined area 26 is defined which, lies in the area of the standing platform 20. Moreover, two schematically portrayed radio remote controls 30, 30' can be seen in FIG. 1, of which one is located within the predetermined area 26 and one is located outside of the predetermined area 26. Furthermore, a radio module 28 is assigned to the drive part 16.

The three transmitting and receiving units 22a, 22b, 22c transmit search signals, which are received and processed by the radio remote controls 30, 30'. The radio remote controls 30, 30' then transmit corresponding response signals which are also received by the respective transmitting and receiving units 22a, 22b, 22c. In an embodiment, only one search signal S transmitted by the transmitting and receiving unit 22a to the radio remote control 30 and one response signal A returned to the transmitting and receiving unit 22a by the radio remote control 30 are depicted in FIG. 1. The response signal A corresponds to the search signal S such that the transmitting and receiving unit 22a can clearly discern that it is a response signal belonging to its search signal.

The distance of the radio remote control 30, 30' to each of the three transmitting and receiving units 22a, 22b, 22c can be determined from the transmission and return times of the respective search and response signals. Since the positions of the three transmitting and receiving units 22a, 22b, 22c are defined in the fixed vehicle coordinate system, the position of the radio remote controls 30, 30' within the fixed vehicle coordinate system can be inferred therefrom. The position of the radio remote controls 30, 30' is determined by an evaluation unit integrated into the control unit 24. The control unit 24 determines that the radio remote control 30 lies outside of the predetermined area 26 such that the radio remote control 30 is not linked to the radio module 28 of the industrial truck 10. In contrast, the radio remote control 30' is within the predetermined area 26 such that the radio remote control 30' is linked to the radio module 28. To accomplish this, the control unit 24 can be configured to control the radio module 28 to transmit a linking signal to the radio remote control 30'. In addition, such a linkage request could already be part of the search signals sent by the transmitting and receiving units 22a, 22b, 22c. Moreover, it can also be stipulated that an operator is on the standing platform 20 as another linkage condition. The operator can for example announce his presence by a dead man pedal disposed on the standing platform 20. The control unit 24 only permits a linkage in this case when an operator is determined on the standing platform 20 and a radio remote control also occurs within the predetermined area 26.

Figure 2:
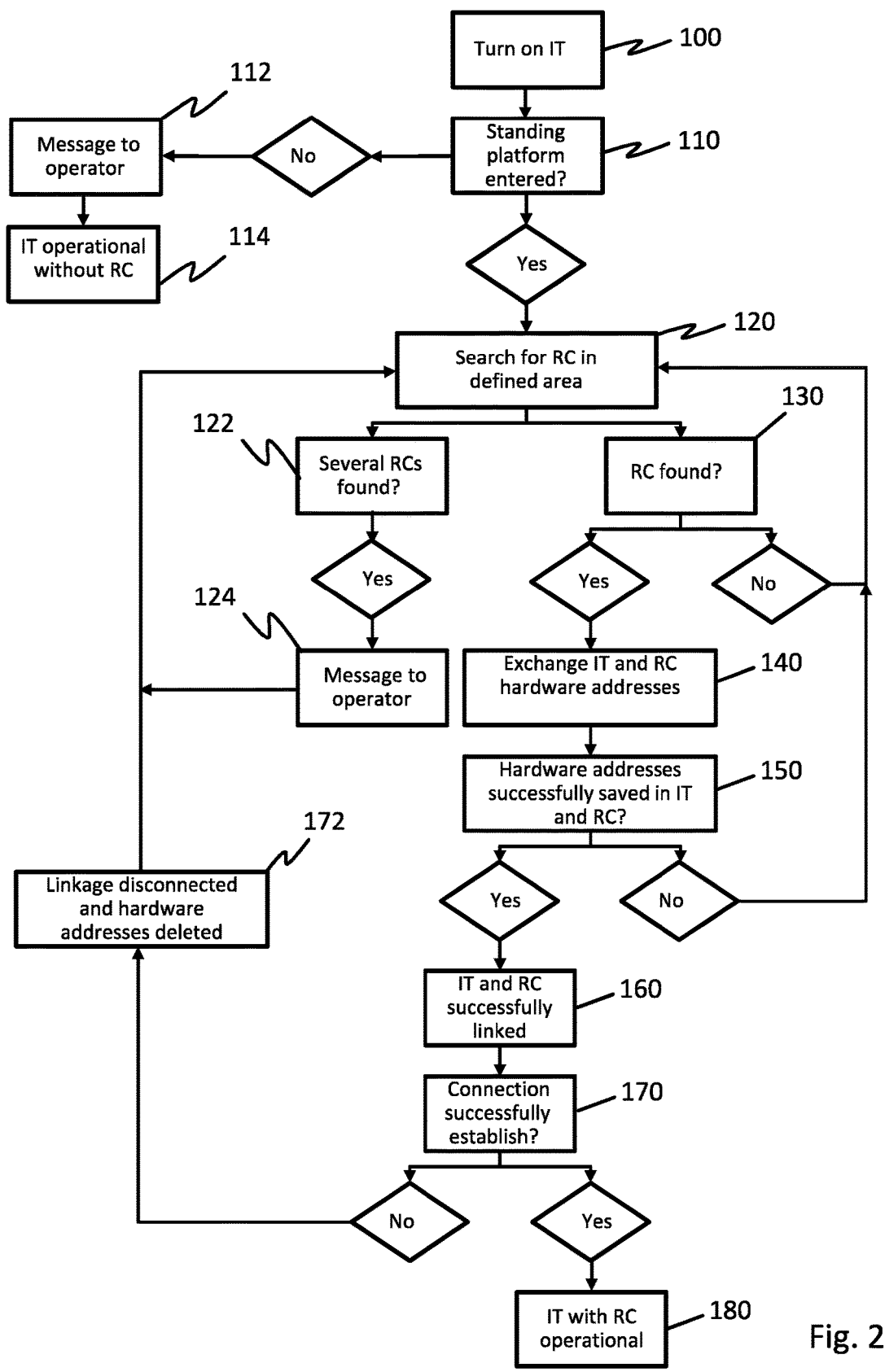
FIG. 2 illustrates a schematic diagram of an embodiment of the method for linking an industrial truck to a radio remote control.

FIG. 2 illustrates an embodiment of a method for automatically linking a radio remote control 30, 30' with an industrial truck 10. The method starts with the industrial truck being turned on ("Turn on IT", step 100). Then the industrial truck checks whether an operator has entered the standing platform ("Standing platform entered?", Step 110). As explained, this can be done for example by the control unit evaluating the signal generated by a dead man pedal. If an operator has not entered the standing platform, a corresponding message is sent to the operator ("Message to operator", step 112). The industrial truck is then operational without a linked radio remote control ("IT operational without RC", step 114). In contrast, if an operator has entered the standing platform, a search is initiated for radio remote controls located within the predetermined area ("Search for RC in defined area", step 120). Correspondingly, the at least three transmitting and receiving units transmit signals.

If several radio remote controls are found within the predetermined area ("Several RCs found?", step 122), a message is sent to the operator ("Message to operator", step 124). This is followed by step 120. When just one remote-control is found within the predetermined area ("RC found?", step 130), the corresponding radio remote control is linked to the industrial truck by an exchange of the hardware addresses of the industrial truck and the radio remote control ("Exchange of IT and RC hardware addresses", step 140). If a radio remote control is not found searching continues, step 120. A radio remote control is considered found when the evaluation of the signal propagation times reveals that the radio remote control is located within the predetermined area. After the linkage, i.e., exchange of hardware addresses according to step 140, the hardware address of the radio remote control is saved in the industrial truck, and the hardware address of the industrial truck is saved in the radio remote control ("hardware addresses successfully saved in IT and RC?", step 150). If this saving is unsuccessful, step 120 follows. If the hardware addresses are successfully saved, the linkage between the industrial truck and radio remote control is also considered successful ("Successful linkage of IT and RC", step 160).

Next, an attempt is made to establish a remote connection between the radio module of the industrial truck and the linked radio remote control ("Connection successfully established?", Step 170). If the connection is successfully established, the industrial truck with the linked radio remote control is operational ("Industrial truck with RC operational", step 180). If the connection is not successfully established, the linkage is disconnected, and the hardware addresses are deleted ("linkage is disconnected and hardware addresses deleted", step 172), and step 120 follows.

The invention claimed is:

1. A system for automatically linking a radio remote control to an industrial truck, the system comprising:
   at least three transmitting and receiving units disposed in a predetermined spatial arrangement relative to each other in the industrial truck, the at least three transmitting and receiving units configured to transmit search signals and receive response signals;
   a radio remote control configured to receive and process the search signals transmitted by the at least three transmitting and receiving units and further configured to transmit corresponding response signals;
   an evaluation unit configured to: (i) determine the signal propagation times of the transmitted search signals (ii) determine the signal propagation times of the corresponding received response signals, and (iii) determine a relative position of the radio remote control with reference to the industrial truck from the signal propagation times; and
   a control unit configured to: (i) link the radio remote control with the industrial truck with the industrial truck when the relative position of the radio remote control lies within a predetermined area, and (ii) produce a 1:1 link between the radio remote control and the industrial truck such that while the 1:1 link is established no other radio remote control can be linked with the industrial truck.

2. The system according to claim 1, further comprising a fixed vehicle radio module disposed on the industrial truck and configured to link to the radio remote control.

3. The system according to claim 1, wherein the industrial truck further comprises a standing platform, and wherein the control unit is configured to recognize an operator located on the standing platform and is further configured to link the industrial truck with the radio remote control when the control unit recognizes the operator on the standing platform.

4. The system according to claim 3, further comprising a display unit assigned to one of the industrial truck and the radio remote control.

5. The system according to claim 4, wherein the control unit is configured to output a message on the display unit when the relative position of the radio remote control is within the predetermined area relative to the industrial truck.

6. The system according to claim 4, wherein the control unit is configured to output a message on the display unit when the operator is not standing on the standing platform.

7. A method for automatically linking an industrial truck with a radio remote control, the method comprising the steps of:
   transmitting search signals by at least three transmitting and receiving units disposed on the industrial truck;
   receiving and processing the search signals by the radio remote control;
   transmitting response signals via the radio remote control corresponding to the search signals;
   determining signal propagation times of the transmitted signals and corresponding received response signals using an evaluation unit;
   determining a relative position of the radio remote control with reference to the industrial truck from at least three of the determined signal propagation times; and
   linking the radio remote control with the industrial truck when the relative position of the radio remote control lies within a predetermined area, and producing a 1:1 link between the radio remote control and the industrial truck such that while the 1:1 link is established no other radio remote control can be linked with the industrial truck.

8. The method according to claim 7, further comprising:
   monitoring a standing platform of the industrial truck for a presence of an operator; and
   linking the industrial truck with the radio remote control when the operator is recognized on the standing platform.

9. The method according to claim 8, wherein the operator is notified of a successful linkage of the radio remote control to the industrial truck.

10. The method according to claim 9, further comprising a display unit configured to display a message when the industrial truck recognizes more than one radio remote control within the predetermined area.

11. A system for automatically linking a remote radio frequency (RF) device to an industrial truck, comprising:
    at least three radio frequency (RF) transceivers mounted to, and spatially separated from each other on, the industrial truck, the at least three RF transceivers configured to transmit search signals and receive response signals;
    the remote RF device configured to receive the transmitted search signals and issue corresponding response signals; and,
    a processor, responsive to the transmitted search and received response signals, and configured to: (i) determine the relative location of the remote RF device based on a signal propagation time of each of the transmitted search and received response signals, (ii) link the remote RF device with the industrial truck when the remote RF device is at a predetermined location relative to the industrial truck such that while the link is established no other radio remote control can be linked with the industrial truck.

12. The system according to claim 11, wherein the processor includes an evaluation unit operative to measure the signal propagation time of each of the transmitted search and received response signals of each of the at least three transceivers.

13. The system according to claim 11, wherein the processor further includes a control unit operative to control the industrial truck once the at least three transceivers are linked to the industrial truck.

14. The system according to claim 13, wherein the industrial truck further comprises a standing platform, and wherein the control unit is configured to recognize an operator located on the standing platform and is further configured to link the industrial truck with the remote RF device when the control unit recognizes the operator on the standing platform.

15. The system according to claim 14, further comprising a display unit assigned to one of the industrial truck and the remote RF device.

16. The system according to claim 15, wherein the control unit is configured to output a message on the display unit when the relative position of the remote RF device is within a predetermined area relative to the industrial truck.

17. The system according to claim 15, wherein the control unit is configured to output a message on the display unit when the operator is not standing on the standing platform.

* * * * *

UNITED STATES PATENT AND TRADEMARK OFFICE
CERTIFICATE OF CORRECTION

PATENT NO. : 10,438,480 B2
APPLICATION NO. : 15/806396
DATED : October 8, 2019
INVENTOR(S) : Oliver Göpner Page 1 of 1

It is certified that error appears in the above-identified patent and that said Letters Patent is hereby corrected as shown below:

In the Claims

Claim 1:
Column 7
Lines 21-22, change "with the industrial truck with the industrial truck when" to --with the industrial truck when--

Signed and Sealed this
Twenty-first Day of April, 2020

Andrei Iancu
*Director of the United States Patent and Trademark Office*